(12) United States Patent
Brewster et al.

(10) Patent No.: US 7,065,449 B2
(45) Date of Patent: Jun. 20, 2006

(54) METHOD AND SYSTEM FOR EVALUATING GEOPHYSICAL SURVEY DATA

(75) Inventors: James Brewster, Lincoln Park, NJ (US); David Humphrey, Houston, TX (US)

(73) Assignee: Bell Geospace, Inc., Houston, TX (US)

( * ) Notice: Subject to any disclaimer, the term of this patent is extended or adjusted under 35 U.S.C. 154(b) by 95 days.

(21) Appl. No.: 10/794,606

(22) Filed: Mar. 5, 2004

(65) Prior Publication Data

US 2005/0197773 A1    Sep. 8, 2005

(51) Int. Cl.
    *G01V 7/16*    (2006.01)
(52) U.S. Cl. .......................................... 702/5
(58) Field of Classification Search ............... 702/2, 702/5; 382/284, 295
    See application file for complete search history.

(56) References Cited

U.S. PATENT DOCUMENTS

| | | | | |
|---|---|---|---|---|
| 5,053,778 A | * | 10/1991 | Imhoff | 342/191 |
| 5,124,915 A | * | 6/1992 | Krenzel | 702/5 |
| 5,150,295 A | * | 9/1992 | Mattingly | 702/5 |
| 5,339,684 A | | 8/1994 | Jircitano et al. | 73/178 R |
| 5,357,802 A | | 10/1994 | Hofmeyer et al. | 73/382 G |
| 5,359,889 A | | 11/1994 | Jircitano et al. | 73/178 R |
| 5,546,107 A | * | 8/1996 | Deretsky et al. | 707/104.1 |
| 5,652,717 A | * | 7/1997 | Miller et al. | 703/6 |
| 5,878,356 A | * | 3/1999 | Garrot et al. | 701/1 |
| 5,894,323 A | * | 4/1999 | Kain et al. | 348/116 |
| 5,922,951 A | | 7/1999 | O'Keefe et al. | 73/382 G |
| 6,075,905 A | * | 6/2000 | Herman et al. | 382/284 |
| 6,078,701 A | * | 6/2000 | Hsu et al. | 382/294 |
| 6,157,747 A | * | 12/2000 | Szeliski et al. | 382/284 |
| 6,169,476 B1 | * | 1/2001 | Flanagan | 340/286.02 |
| 6,421,610 B1 | * | 7/2002 | Carroll et al. | 702/5 |
| 6,501,422 B1 | * | 12/2002 | Nichols | 342/357.17 |
| 2003/0033086 A1 | | 2/2003 | Lee et al. | |

FOREIGN PATENT DOCUMENTS

GB       2 274 951        8/1994

(Continued)

OTHER PUBLICATIONS

Sander Stephen et al., "Advantages of close line spacing in airborne gravimetric survey," *Leading Edge*, vol. 22, No. 2, p. 136-137 (Feb. 2003).

(Continued)

*Primary Examiner*—Donald McElheny, Jr.
(74) *Attorney, Agent, or Firm*—McDonnell Boehnen Hulbert & Berghoff LLP

(57) ABSTRACT

A method and system for evaluating geophysical survey data is provided. Two neighboring flight paths of a geophysical survey are likely to have geophysical characteristics in common because neighboring flight paths cover geographic areas in a close proximity to one another. As such, neighboring flight paths will likely have similar geophysical characteristics and similar recorded data. Therefore, errors in data can be estimated by comparing data recorded from neighboring flight paths. If data from a flight path differs significantly from data recorded from a neighboring flight path, then the data from one or both flight paths may be corrupted and at least one of the survey lines may need to be repeated. This auto evaluate method allows field personnel to judge data close to real time to determine whether to repeat a flight path while still out in the field.

26 Claims, 8 Drawing Sheets

FOREIGN PATENT DOCUMENTS

| | | |
|---|---|---|
| WO | WO 02/103398 | 12/2002 |
| WO | WO 03/032015 | 4/2003 |

OTHER PUBLICATIONS

Eaton Susan, "In Gravity's Pull," *New Technology Magazine*, p. 1-4 (Apr. 2003-May 2003).

Argyle Malcolm, et al. "AIRGrav results: a comparison of airborne gravity data with GSC test site data," *Leading Edge: Oct. 2000 Soc of Exploration Geophysicists*, vol. 19, No. 10, p. 1134, 1136, 1138 (Oct. 2000).

Derek Fairhead J., et al. "Advances in gravity survey resolution," *Leading Edge*, vol. 21, No. 1, p. 36-37, (Jan. 2002).

* cited by examiner

METHOD AND SYSTEM FOR EVALUATING GEOPHYSICAL SURVEY DATA

FIELD OF INVENTION

The present invention relates to methods for processing geophysical survey data, and more particularly, to auto-evaluating geophysical survey data in real time to determine whether to repeat a survey flight.

BACKGROUND

Gravity surveying is one technique in modern exploration for mineral and petroleum commodities. For example, detection of geophysically significant subsurface anomalies potentially associated with ore bodies or hydrocarbon deposits can be made using gravity surveying techniques since the existence of gravitational anomalies usually depends upon the presence of an excess or deficit mass associated with the deposit. For example, the gravitational anomaly of a body of ore with a density contrast of 300 kg m$^{-3}$ and a dimension of 200 m buried at a depth of 100 m is typically $2 \times 10^{-6}$ ms$^{-2}$, for example, which is 0.00002% of the normal Earth gravity field. This relatively small effect is normally measured in units of milli gals (mGal), which is the unit for the free air and Bouguer gravity field measurements and is equivalent to $10^{-5}$ m/s$^s$. Thus, for the above example, the body of ore would be represented by 200 mGal.

Currently, many measurements have been made using instruments of the LaCoste/Romberg type that are essentially ultrasensitive spring balances detecting a small difference in weight caused by the gravity anomaly. The measurements are subject to a wide variety of environmental influences, and measurements should be performed relative to a standard point that is used regularly during the survey as a fixed reference for removal of drifts in the instrument. This procedure can be slow, and may require extensive information on local topography and geology since a normal variation of gravity with height is approximately 0.3 mGal per meter. Within moving platforms, such as aircraft, using this type of relative gravity instrument can be difficult because using precision radar altimeters and pressure sensors to achieve vertical position to as little as one meter can impose limitations on the order of a few hundred mGals on the gravity data.

For this reason, some large scale geophysical prospecting has progressed towards gradiometry. In principle, measurement of a gradient of a gravity field over a known baseline allows accelerations due to motion of the platform itself to be cancelled out. Gravity gradients are the spatial derivative of the gravity field, and have units of mGal over distance such as mGal/m. The standard unit of gravity gradiometry is the Eötvös (E), which is equal to $10^{-9}/s^2$ or a tenth of a mGal over a kilometer (e.g., gradient signatures of shallow Texas salt domes are typically 50–100 E).

Three-dimensional Full Tensor Gradient (3D FTG) technology was developed by the US Navy and later adapted to the Oil & Gas industry to complement seismic technology and provide an independent method of imaging around salt and basalt areas, for example. Full tensor gradiometry measures the gradient of the gravity field, and thus is measuring a small quantity (1 Eotvos=0.1 mgal/Km). This can require unique acquisition parameters to be used to insure a high quality survey.

Acquisition of 3D FTG data requires the operator to consider the unique nature of such a high frequency, small amplitude measurement. Acquisition parameters are dictated by several factors including, for example, water depth, target depth, geologic concerns and the type of imaging problem being modeled. FTG data may be recorded in 800 MB files (about 2 hours of data) for archival and quality assurance checks, for example.

The interpretation of geophysical data collected from airborne measurements occurs on the ground in a geological office. The purpose of the interpretation is to establish priorities for subsequent investigation. Thus, data can be sent via satellite to the Bell Geospace Technical Department in Houston for analysis, for example. An operator then processes each data file to determine noise values, acceleration values, platform performance, individual instrument data plots, environmental conditions, positional accuracy, and other criteria, for example. In the event that a survey line of data is substandard, the line is identified and will need to be repeated to ensure optimum quality of data, and thus a crew will need to be sent back out to the survey area.

However, to insure an efficient geologic survey, it would be desirable to monitor data in close to real time to determine whether signal to noise requirements and other acquisition parameters are being met to lessen the inconvenience of repeating survey lines.

SUMMARY

In an exemplary embodiment, a method for evaluating geophysical measurements is provided. The method comprises receiving first geophysical data recorded from a first flight path of a geophysical survey flight and receiving second geophysical data recorded from neighboring flight paths in the geophysical survey flight. The method further comprises comparing the first geophysical data and the second geophysical data to estimate the quality of the first geophysical data.

In another respect, the exemplary embodiment may take the form of a method for evaluating geophysical measurements. This method comprises receiving geophysical data recorded from a geophysical survey flight. The geophysical data is recorded from a series of flight paths covering a survey area. The method further comprises selecting a first set of data that is recorded from a first flight path from the geophysical data. The method further includes generating a grid using neighboring geophysical data from the geophysical data. The neighboring geophysical data is recorded from flight paths that neighbor the first flight path. The method also includes comparing the first set of data and the grid to estimate a quality of the first set of data.

In yet another respect, the exemplary embodiment may take the form of an alternate method for evaluating geophysical measurements. This method includes recording geophysical data during a geophysical survey flight, which comprises a series of flight paths covering a survey area. The method further includes, during the geophysical survey flight, evaluating the geophysical data to estimate a quality of the geophysical data. The geophysical data may be evaluated by selecting a first set of data recorded from a first flight path of the geophysical data, generating a grid using neighboring geophysical data from the geophysical data, and determining the standard deviation between the first set of data and the grid to estimate a quality of the first set of data.

These as well as other features, advantages and alternatives will become apparent to those of ordinary skill in the art by reading the following detailed description, with appropriate reference to the accompanying drawings.

DETAILED DESCRIPTION OF EXEMPLARY EMBODIMENTS

In an exemplary embodiment, a method of substantially real time quality assurance checks of geological survey data is provided. Detection of geophysically significant subsurface anomalies potentially associated with ore bodies or hydrocarbon deposits can be made by vehicle mounted surface or airborne regional gravitational studies. Recorded geophysical data is processed on the vehicle to determine whether the data contains any errors, or to determine whether to repeat a survey to recollect data. In an exemplary embodiment, data from a selected flight path is compared to data recorded from neighboring flight paths to judge the quality of the recorded data from the selected path. This provides a basis to determine whether to repeat a survey or flight path in real time.

I. Survey Flying

A geophysical survey is conducted, using specialized instruments, by flying over a terrain of interest at a low altitude of 100 m, for example. A gravity survey flight plan usually specifies nominal ground clearances of between 80 and 120 meters, dependent upon topographic characteristics. A series of nominally parallel survey lines can be flown until the total region to be surveyed has been covered.

Figure 1:
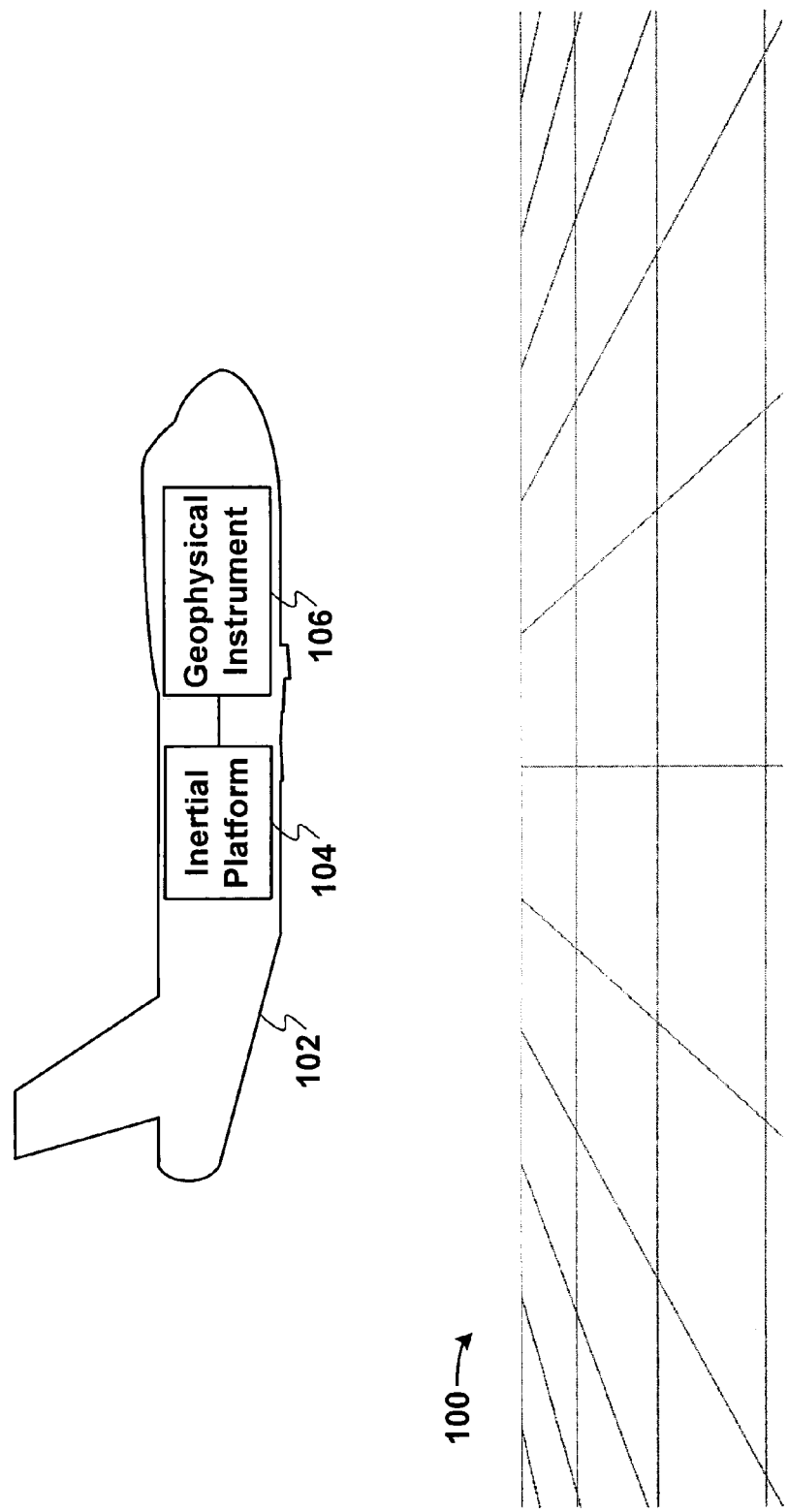
FIG. 1 illustrates one example of a conceptual survey flight.

FIG. 1 generally illustrates a conceptual survey flight. A geographic area 100 is selected for a survey, and the area can be divided into survey lines to facilitate collection of data. Also, a digital elevation map (DEM) can be created containing position data and used to facilitate the survey. For example, the DEM is used to calculate the topography generated gravity gradient along a survey line so that the topography generated gravity gradient can be subtracted from measured gravity gradients to reveal gravity gradient anomalies that are not due to the topography, but rather due to potential ore bodies or hydrocarbon deposits.

Airborne geophysical measurements can be made using an aircraft 102 equipped with an inertial platform 104 and a geophysical instrument 106. The inertial platform 104 provides measurements of the attitude (roll, pitch and heading) of the aircraft. The inertial platform 104 can be a component of the geophysical instrument 106 that provides accurate measurements of the vertical velocity and acceleration of the airborne platform ten or more times per second, for example. (However, as illustrated, the inertial platform 104 can also be a separate component. More description is provided below in relation to FIG. 2). Using these data together with position data (possibly obtained from an onboard GPS), the detailed trajectory that was flown by the airborne platform may be determined so that the collected data can be mapped.

Different geophysical instruments may be used, such as: a magnetometer to measure the distortions and additions to the magnetic field of the Earth due to rocks and minerals below the aircraft; an electromagnetic (EM) sounding system to measure the effects of electrical conductivities of rocks and minerals below the aircraft; a radiometric survey system to measure radioactive emanations from radioactive isotopes of elements that are constituent components of rocks and Earth below the aircraft; and a gravimeter sensor to measure the magnitude of the Earth's gravity, and more recently a gravity gradiometer to measure the spatial rate of change of the Earth's gravity.

In an exemplary embodiment, the geophysical instrument 106 is a gravity gradiometer. However, more than one geophysical instrument 106 may be used, and the instruments may be mounted in the same or different aircraft.

A gravity gradiometer may measure the gradient of the Earth's gravitational field, and may also yield the attitude of the aircraft in three dimensional space as well as the vertical velocity and acceleration of the aircraft. A gravity gradiometer provides a signal from which the instantaneous gradient of gravity can be derived. (Note that a measurement of gravity gradient may be preferred for detection of gravity disturbances from an airborne platform because a direct measurement of gravity may not be able to distinguish the gravity signal from accelerations of the instrument associated with the motion of the aircraft). The gravity gradiometer is operable to respond to the variations in density of the rocks and minerals in the vicinity of the point below the aircraft. For example, the gravity gradiometer measures one or more components of the gradient of gravity related to a geographic area, and is expressed as the gradient of a gravity vector. For example, the gradient of the gravitational acceleration can be expressed by a symmetric tensor $G_{\mu\nu}$ defined as:

$$G_{\mu\nu} = \begin{bmatrix} Gxx & Gxy & Gxz \\ Gyx & Gyy & Gyz \\ Gzx & Gzy & Gzz \end{bmatrix} \quad \text{Equation (1)}$$

where the components of the tensor $G_{\mu\nu}$ describe the nine components of the gravity gradients and $$Gxx+Gyy+Gzz=0 \quad \text{Equation (2)}$$

G is the gravitational potential and satisfies Laplace's equation. The components Gx and Gy are the horizontal components of the gravitational vector and Gz is the vertical component. Also, the components Gxy, Gxz, Gyz, Gyy and Gzz are independent. Further, in-line components are the Gxx, Gyy, and Gzz components, and cross components are the Gxy, Gxz and Gyz components. For example, cross signals are gradients measured when any two accelerometers align horizontally (e.g., Gxx-Gyy). In-line gradients are measured when the same accelerometers are at a 45 degree angle to horizontal (e.g., Gxy). A gravity gradiometer outputs one cross and one in-line signal.

Figure 2:
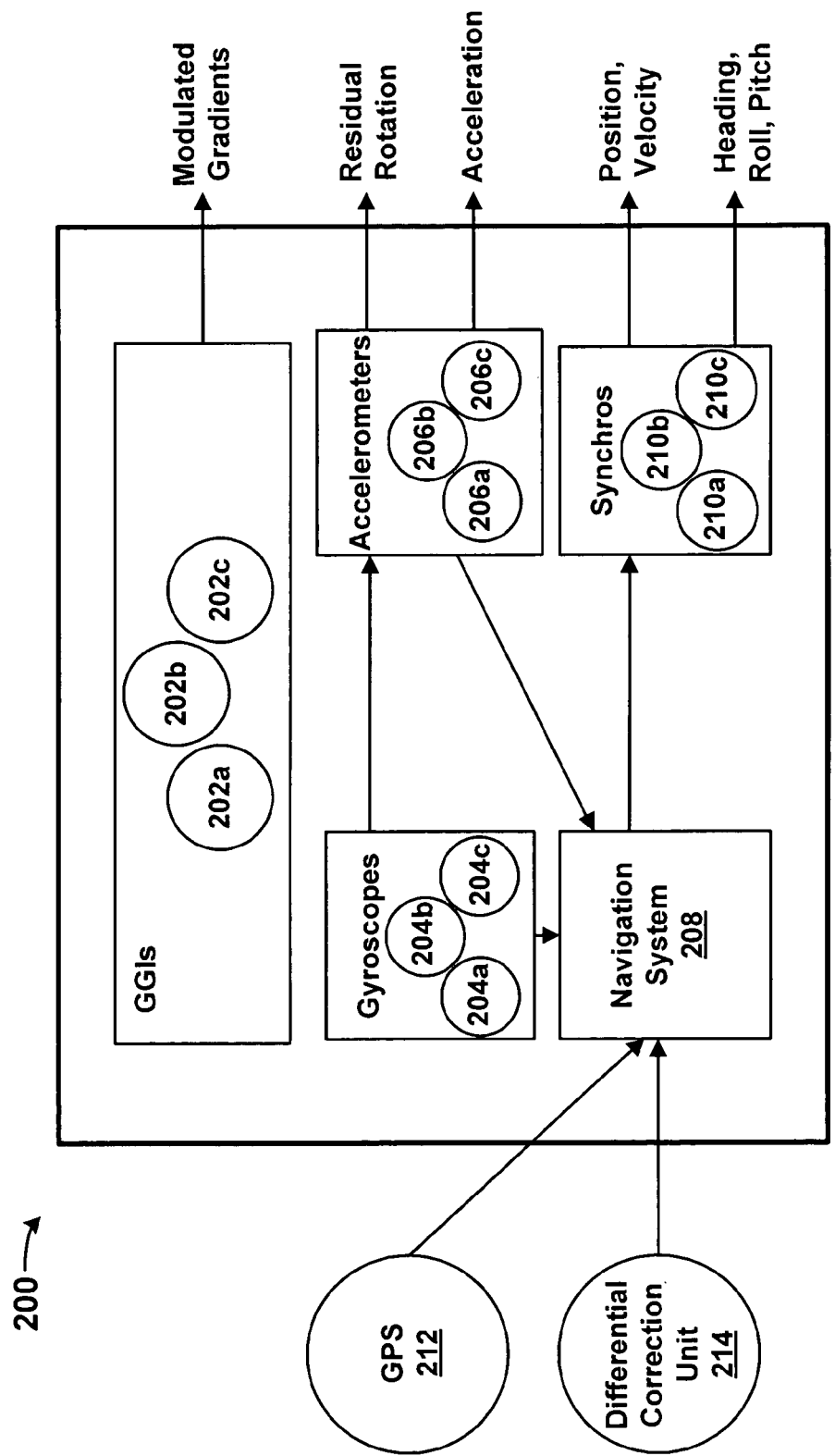
FIG. 2 illustrates one embodiment of a Full Tensor Gradient (FTG) instrument.

A gravity gradiometer may be included within a Full Tensor Gradient (FTG) instrument, which can perform the functions of the geophysical instrument 106 and the inertial platform 104. FIG. 2 illustrates one embodiment of an FTG instrument 200. The FTG 200 includes three Gravity Gradiometer Instruments (GGIs) 202a–c, two two-axis gyroscopes 204a–c, three accelerometers 206a–c, a navigation system 208, three synchrometers 210a–c, a GPS 212, and a differential correction unit 214. The instrument may include more or less components as well. For example, the instrument may include peripheral equipment, such as a system control and monitoring computer, a survey planning and tracking computer, GPS and DGPS systems, satellite communication systems, and data processing and archival systems. When required, for marine applications, a multi-beam echo-sounder system could also be included for a Swath bathymetry measurement and correction of free air gradients. When required, for airborne applications, radar altimeter or light detection and ranging (LIDAR) could also be included for the measurement and correction of gradients originating from the terrain. Further, the FTG 200 can also include a gravimeter. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

The GGIs 202a–c may be of the type, for example, as described in U.S. Pat. No. 5,357,802 to Hofmeyer, et al., entitled "Rotating Accelerometer Gradiometer," which is entirely incorporated herein by reference. The GGIs 202a–c can be mounted on an inner gimbal and stabilized about all three rotation axes. At the core of each GGI may be an accelerometer assembly that rotates about a defined axis. The shear gravity gradient components in the plane perpendicular to this direction can then be detected. Each GGI may thus output one cross and one in-line signal. Therefore, six channels are used in the production of a tensor dataset.

The accelerometers 206a–c are mounted on a horizontal disc to measure in-line and cross components of the gravity gradient. The accelerometers are equally spaced around the circumference of a circle, with their sensitive axes tangential to the circle. In use, the accelerometers are spun around an axis normal to the circle that passes through its center. The outputs of the accelerometers are combined in a manner to cancel common mode output signals.

The gyroscopes 204a–c and accelerometers 206a–c, in combination with the GPS input, provide measurements of the acceleration, velocity, position and rotation of the FTG 200. The navigation system 208, synchrometers 210a–c, GPS 212 and the differential correction unit 214 provide position data, and enable the FTG 200 to map the trajectory that was flown by the airborne platform in which the FTG 200 is contained.

The FTG 200, and the individual components within the FTG 200, can require calibration. Calibrations are performed at initial installation and periodically, usually monthly, while in operation. Calibrations include aligning the platform gyroscopes and accelerometers, and determining bias and scale factor values for the three GGIs, for example. A bias calibration is used to correct the offset output error of individual sensors. A gyroscope bias may, for instance, appear as angular drift, such as an increasing rise in angular velocity and acceleration over time. The bias calibration can reset the gyroscope output to a correct offset according to the initial calibration testing. Similarly, scaling errors are a linear deviation of a measured rate from the true rate; as the exterior force is increased on the system, the inertial sensor outputs may be amplified or attenuated. Other calibrations may also be performed such as a misalignment calibration, a non-orthogonality calibration, a mass imbalance calibration, and other dynamic and temperature related calibrations.

II. FTG Data Processing

Figure 3:
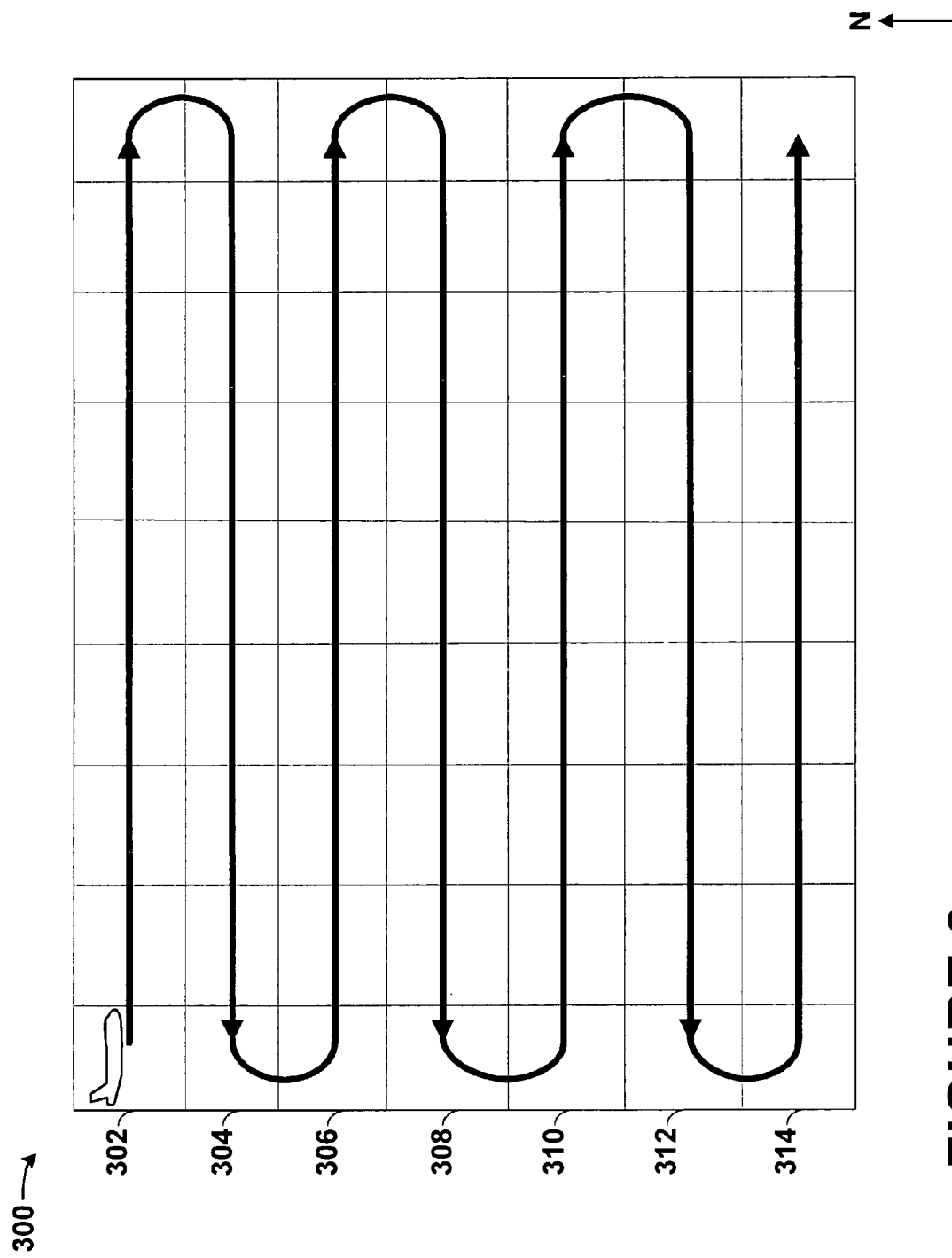
FIG. 3 illustrates one example of a survey flight pattern.

In an exemplary embodiment, geophysical data is recorded and associated with a flight trajectory that is generally a straight line. FIG. 3 illustrates one example of a survey flight pattern. A survey area 300 can be divided in a grid, resulting in seven rows 302–314 corresponding to flight paths, for example. The airplane may then fly a straight path for a certain distance to collect geophysical data along that path. Subsequently, the airplane can reverse directions to fly a substantially straight path to collect geophysical data from the terrain that is South of the first flight path. Thus, the airplane can fly in a series of nominally parallel survey lines until the total survey area 300 has been covered. In this example, the airplane flies from North to South; however, the flight paths could be configured in any manner.

FTG data can be recorded in 400 or 800 MB files (about 1 or 2 hours of data) for archival and quality assurance checks, for example. However, more or less data can be recorded at once. The data may be recorded into respective files based on the flight paths 302–314. The data is then examined to determine whether the data meets certain quality standards. For example, the data can be examined to determine whether the data accurately represents the geophysical characteristics of the survey area.

Figure 4:
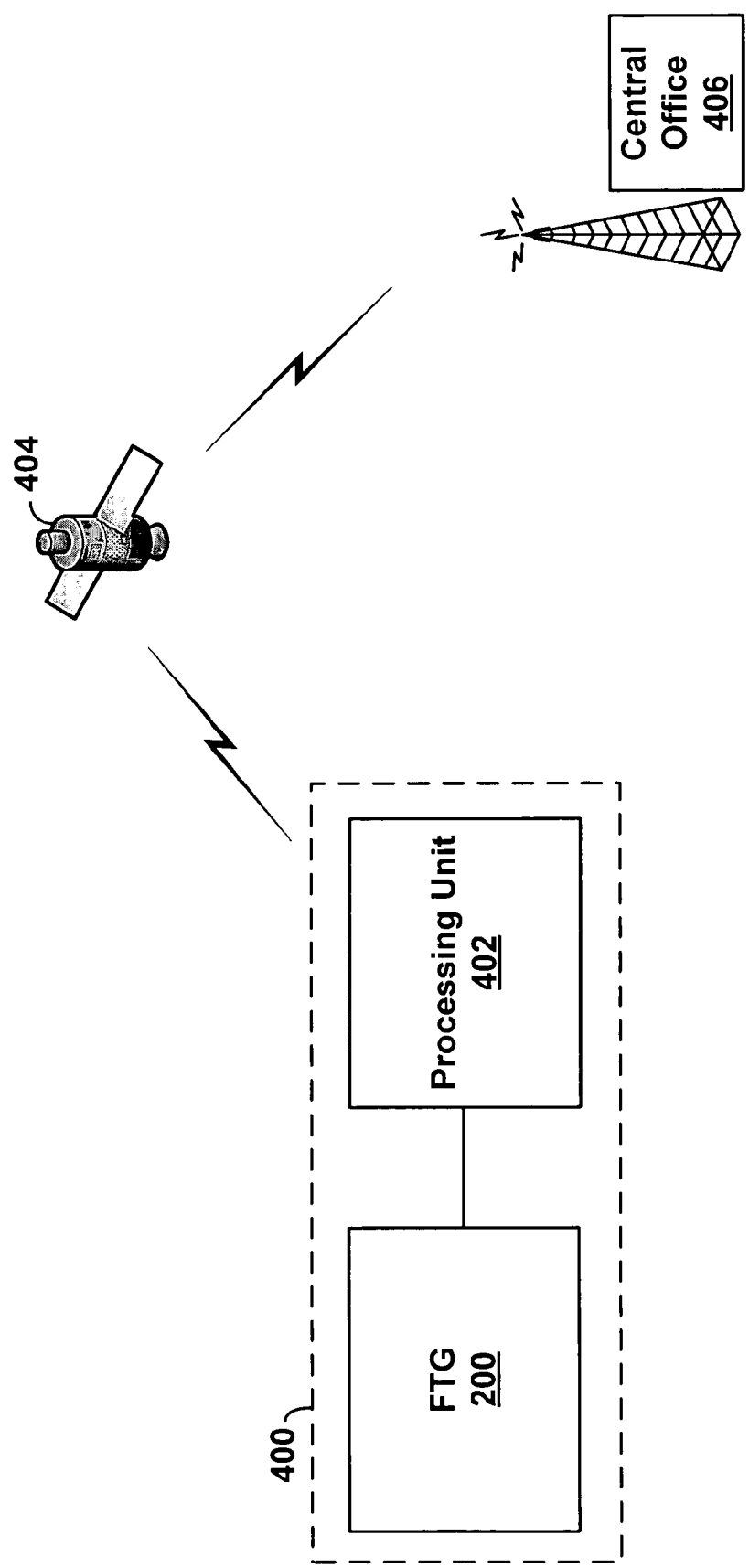
FIG. 4 is a block diagram illustrating one embodiment of a system for examining geophysical survey data.

FIG. 4 is a block diagram illustrating one embodiment of a system for examining the FTG data. The FTG 200 and a processing unit 402 may be included within a platform 400 onboard a survey vessel to record geophysical data. As shown, the FTG 200 can download or send the data to the processing unit 402. The processing unit 402 may be any type of computer, portable computer, or other component operable to execute appropriate software to process the data. In one embodiment, the processing unit 400 may be a component of the FTG 200, and thus the processing unit 402 can receive and process the data accordingly. The processing unit 402 may execute software programs to determine whether the data is acceptable or to estimate whether the data contains errors.

Subsequently, the processing unit 402 may send the data via a satellite 404 to a central office 406. The processing unit 402 may send the data via other wireless or wired means as well. The data can be further processed and examined at the central office 404 to determine whether the data is acceptable, and to determine whether it may be necessary to repeat all or a portion of a survey flight.

Figure 5:
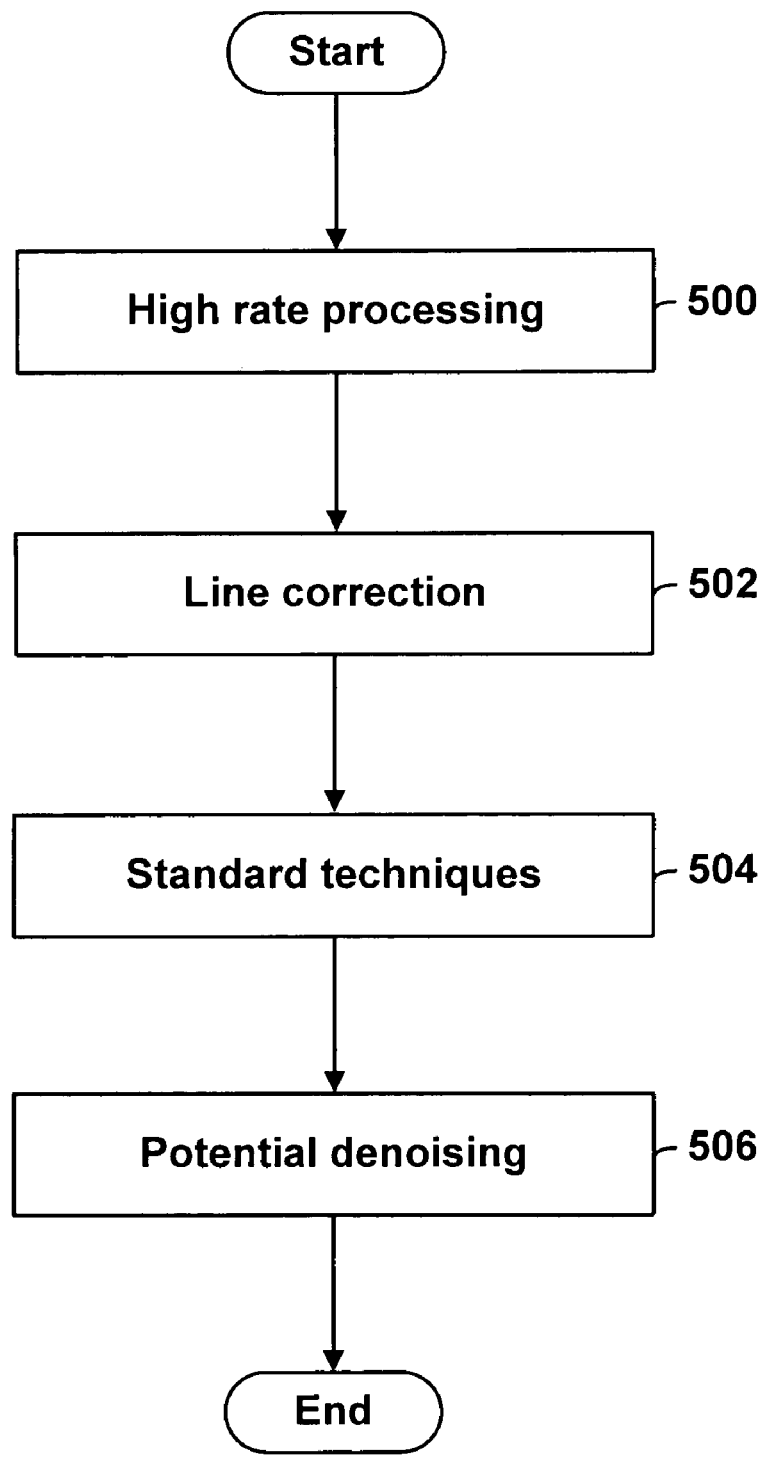
FIG. 5 is a flowchart depicting one embodiment of a method for processing FTG data.

In one embodiment, FTG data processing may occur in four phases, as shown in FIG. 5: high rate post mission compensation 500, line correction 502, application of standard data processing techniques 504, and a noise reduction technique referred to as harmonic fit 506 to produce the final data. These four processing steps are discussed below.

The FTG 200 logs 400 megabytes of data an hour and subsequently performs nonlinear corrections on the raw data, as shown at block 500. These initial corrections are derived from highly sampled data, e.g., sampled at 128 hertz from the GGI's and 1024 hertz from the accelerometers and gyroscopes. Example corrections include, subtracting the effects of acceleration and rotation (e.g., self-gradient) due to the aircraft, and correcting for platform rotations recorded by the gyroscopes.

In particular, a self-gradient correction is the subtraction of the effect of the local surroundings from the GGI output. The local surroundings constitute basically anything on or in the data collection vehicle. Centripetal acceleration is present due to the Earth's rotation and the motion of the vehicle over the Earth's surface. In addition, the centripetal acceleration can be present because the platform can be rotated at approximately 300 degrees an hour and this rotation generates a centripetal acceleration that is proportional to the distance from the axis of rotation, and varies linearly with position. A correction can be derived from two data sources: a command gyroscope-torque (e.g., a rate of rotation deliberately imposed on the platform to maintain the platform at a level position relative to the local horizon and to produce the carousel rotation) and a gyroscope pick-off angle (e.g., a rotation of the system as detected by the platform gyroscopes).

After performing the high rate processing 500, the data is decimated to a rate more appropriate for geological features, for example, usually 1 to 10 seconds. Thus, the data is down-sampled to a lower rate (e.g., from 1024 to 1 sample/sec).

Next, the data is corrected using line correction 502. This set of corrections is applied to the de-sampled data, and applies to the survey as a line network. As one example, remaining errors may be slowly varying, such as instrument drift and residual self-gradient. Over a period of hours, a GGI may exhibit varying degrees of drift (e.g., typical drift may be 2 Eotvos/hour). To compensate for such variation, a set of time based beta-spline adjustments (e.g., knot position adjustments) can be made to minimize cross point differences by breaking the survey into a series of straight-line segments joined at intersections and examining the lines at the intersections, for example. Other types of line correction can also be implemented, such as those discussed below in relation to FIG. 6.

Subsequently, standard data processing techniques 504 can be applied to the data. For example, various filters and low order polynomial line adjustments are applied to the data. In this manner, frequencies of data within the signal that are too high to possibly be real are removed, and the data can be leveled, e.g., corrected for mis-ties by identifying large differences between the data and data recorded from a neighboring flight path. These processes can be performed using the Oasis Montage software package from Geosoft, Inc., for example.

Next, a noise reduction technique, referred to as potential denoise 506 (e.g., harmonic fit), is executed to produce the final data. The components of the gravity gradient, while being measured separately by the FTG, are not totally independent from each other. The components are derivatives of the gravitational potential, which must be a solution to the Laplace equation. A function that satisfies the Laplace equation is known as a harmonic function. Any part of the measured gradient output that is not consistent with the gravitational potential being harmonic can be discarded. This provides a means of separating desired signals from noise. In three dimensional Cartesian coordinates the solutions to the Laplace equation are functions that have an exponential dependence in one direction and sinusoidal dependencies in the two perpendicular directions.

The harmonic fit noise reduction technique is performed by simultaneously using all five gradient tensor components to estimate the coefficients of the harmonic basis functions that describe the gravitational potential. The individual gradients are then re-calculated by differentiation of the resulting function. In effect, all gradient outputs of the FTG are pooled into a combined measurement of the gravitational potential.

The resultant line data can then be placed on a grid and displayed in map form. Random noise can be effectively removed by 2-D filters, which run more quickly and do not necessitate re-leveling. The resultant filtered grids are re-sampled onto the line data for comparison with the unfiltered data, and for further 2-D analysis.

III. Auto Evaluation

In an exemplary embodiment, quality checks are performed on the FTG data before, during, and/or after the FTG data processing that is illustrated in FIG. 5. Performing quality checks helps to ensure that the data collected meets certain standards, or to help ensure that the data is not corrupt. Quality checks may be performed on the data as an auto evaluation method, such that a processor automatically performs the quality checks after the data is collected.

In an exemplary embodiment, data from a selected flight path is compared to data recorded from neighboring flight paths to judge the quality of the recorded data from the selected path. Two neighboring flight paths are likely to have geophysical characteristics in common. For example, flight path 302 and flight path 304 (as illustrated in FIG. 3) are considered neighboring flight paths because these flight paths cover geographic areas in close proximity to one another. As such, the terrain of the neighboring flight paths is likely to be very similar, and thus will have similar geophysical characteristics and similar recorded data. Therefore, errors in data can be estimated by comparing data recorded from neighboring flight paths. For example, if data from a flight path differs significantly from data recorded from a neighboring flight path, then the data from one or both flight paths may be corrupted and at least one of the survey lines may need to be repeated.

Figure 6:
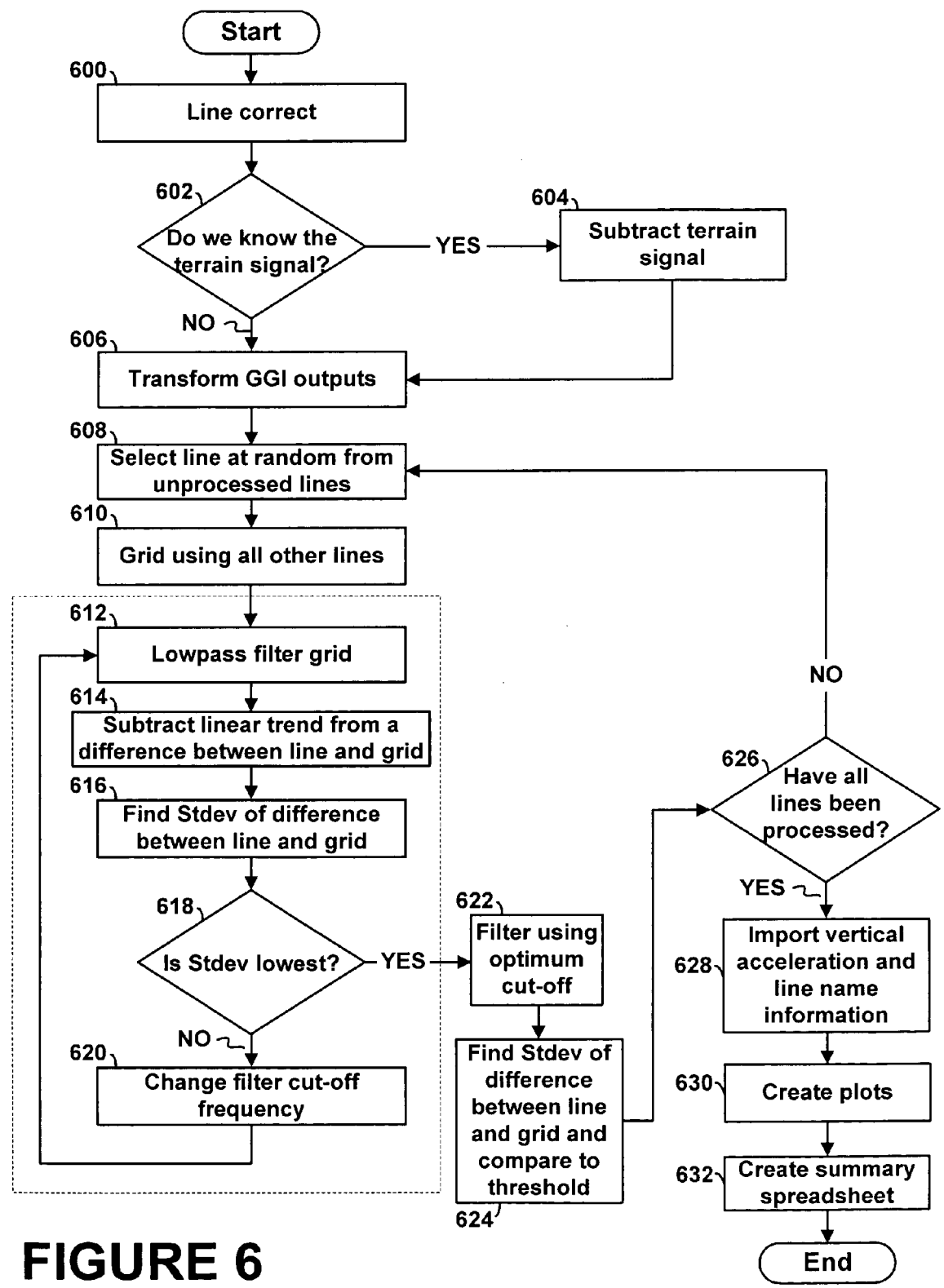
FIG. 6 is a flowchart depicting one embodiment of a method for auto evaluating geophysical survey data.

FIG. 6 is a flowchart depicting one embodiment of a method for auto evaluating geophysical survey data. Initially, partially processed FTG data is received at the processing unit 402, which executes a line correct algorithm, as shown at block 600. The line correct algorithm removes drift and vehicle orientation dependence from the data. In particular, it is desirable to remove effects of GGI bias errors, GGI drift and self-gradient from the FTG data. Self gradient is the gravity gradient from any source located onboard the survey vehicle. The self gradient manifests itself as a relationship between the GGI output and the vehicle orientation. A magnitude of the self gradient can vary as fuel is consumed, for example. Thus, the line correct algorithm may include dividing the data into subsets, and each subset contains data acquired on a single survey flight and comprises lines flown in the same approximate direction with the same carousel angle. Data from each survey flight is treated separately. By solving a linear optimization problem involv ing the bias, drift and heading data and the FTG data, the bias, drift and heading dependence from each GGI output can be removed (e.g., assuming that the heading dependence is fixed). Subsequently, roll dependencies and any heading dependency that was not taking into account is removed from each subset of data by using a linear optimization. (The dependencies may be allowed to vary with time, but only such that the angular coefficients change in a linear manner with time).

Next, the processing unit 402 determines whether the terrain signal is known, as shown at block 602. For example, a signal expected from the shape of the terrain can be supplied to the system. If the terrain signal is known, the terrain signal is subtracted from the data from the GGI outputs, as shown at block 604. This can improve the evaluation of GGI performance when flying over hilly ground, for example.

Following, the GGI outputs are transformed into a reference coordinate frame, as shown at block 606. Each of the three GGIs of the FTG 200 generates two outputs; an in-line and a cross. These are gravity gradients in the coordinate frame of the inertial platform onboard the survey vehicle. The output's relationship to gravity gradients in the Earth's coordinate frame depends upon an angle between a reference direction (e.g., predefined arbitrary direction) on the inertial platform and true north. The angle is referred to as "the carousel angle." In the course of a survey, the carousel angle may vary from one flight path (or line) to the next by a multiple of 120 degrees, for example. If the GGI outputs are to be compared using neighboring lines, a difference in the carousel angle should be taken into account. For example, in one embodiment, when comparing neighboring lines, it is assumed that a GGI will measure the same thing on the neighboring line and for this to be true, the carousel angle has to be the same. Thus, the effect of a carousel angle variance can be removed by calculating gradients in the Earth's coordinate frame using the six GGI outputs, and then calculating the GGI outputs that would arise from these gradient fields if the carousel angle was the same everywhere. Even though we have different carousel angles on neighboring lines, after such a transformation, the GGI outputs represent outputs that have the same carousel angle.

As one example, the inline and cross GGI outputs are transformed into gravity gradient tensor components in a North-East-Down coordinate system. If the outputs from a first GGI are inline 1 ($i_1$) and cross 1 ($c_1$), and similarly for the second and third GGI, then the following equation can be used to make the transformation:

$$\begin{pmatrix} T_{ZZ} \\ (T_{NN} - T_{EE})/2 \\ T_{NE} \\ T_{NZ} \\ T_{EZ} \end{pmatrix} = \begin{pmatrix} i_2 - i_1 \\ i_3 - i_2 \\ c_1 \\ c_2 \\ c_3 \end{pmatrix} \quad \text{Equation (3)}$$

where the 5-by-5 matrix M is:

$$M = \begin{pmatrix} 0 & 0 & \frac{2}{3} & \frac{2}{3} & \frac{2}{3} \\ b_1\cos\left(2\theta - \frac{7}{6}\pi\right) & b_1\cos\left(2\theta - \frac{3}{2}\pi\right) & b_3\cos\left(2\theta - \frac{2}{3}\pi\right) & b_3\cos\left(2\theta - \frac{4}{3}\pi\right) & b_3\cos(2\theta) \\ b_1\cos\left(2\theta - \frac{5}{3}\pi\right) & b_1\cos(2\theta) & b_3\cos\left(2\theta - \frac{7}{6}\pi\right) & b_3\cos\left(2\theta - \frac{11}{6}\pi\right) & b_3\cos\left(2\theta - \frac{1}{2}\pi\right) \\ b_2\cos\left(\theta - \frac{11}{6}\pi\right) & b_2\cos\left(\theta - \frac{3}{2}\pi\right) & b_4\cos\left(\theta - \frac{4}{3}\pi\right) & b_4\cos\left(\theta - \frac{2}{3}\pi\right) & b_4\cos(\theta) \\ b_2\cos\left(\theta - \frac{1}{3}\pi\right) & b_2\cos(\theta) & b_4\cos\left(\theta - \frac{11}{6}\pi\right) & b_4\cos\left(\theta - \frac{7}{6}\pi\right) & b_4\cos\left(\theta - \frac{1}{2}\pi\right) \end{pmatrix} \quad \text{Equation (4)}$$

and where $\theta$ is the carousel angle and T are the tensor values. The constant coefficients are:

$$b_1 = \frac{2}{9}\sqrt{3} \quad \text{Equation (5)}$$

$$b_2 = \left(\frac{2}{3}\right)^{\frac{3}{2}} \quad \text{Equation (6)}$$

$$b_3 = \frac{2}{3} \quad \text{Equation (7)}$$

$$b_4 = \frac{\sqrt{2}}{3} \quad \text{Equation (8)}$$

Analysis of the matrix illustrates that there are only five equations to describe the six tensor components. In a non-rotating frame and in a medium of negligible density, the gravitational potential obeys the Laplace equation and the gradient tensor has zero trace, i.e.:

$$T_{NN} + T_{EE} + T_{ZZ} = 0 \quad \text{Equation (9)}$$

This reduces the number of independent tensor components to five. The Laplace condition can be used to determine the sixth tensor component.

The expression for Tzz is independent of carousel angle, as shown below:

$$T_{ZZ} = (\tfrac{2}{3})(c_1 + c_2 + c_3) \quad \text{Equation (10)}$$

The other four components can be separated into two pairs according to their rate of carousel dependence. If the inline and cross outputs were to remain constant then $T_{NZ}$ and $T_{EZ}$ vary sinusoidally at a rate of one times carousel angle, the other pair, $T_{NE}$ and $(T_{NN}-T_{EE})/2$ vary at twice the carousel angle. This reflects symmetry of these gradients with respect to a rotation of the coordinate system. Tzz is invariant with respect to rotation about a vertical axis. $T_{EZ}$ is mapped into $T_{NZ}$ by a rotation of 90 degrees. Further, a rotation of 45 degrees maps $T_{NE}$ into $(T_{NN}-T_{EE})/2$. This symmetry can be seen in the matrix M in that the operands of the cosines in the third row are phase shifted from those in the second row by π/2 radians. Likewise, a phase shift of π/2 in the carousel angle maps the forth row of M into the fifth row.

Note that the auto-evaluation method could also be performed on the GGI outputs in the Earth coordinate frame (i.e., the GGI outputs prior to the transformation). However, in the exemplary embodiment, the outputs are transformed into the reference coordinate frame, processed, and then transformed back into the Earth's coordinate frame.

Next, after the transformation, the processing unit 402 selects data representing a flight path at random from the raw data, as shown at block 608. Choosing the next line to process at random can help eliminate systematic errors tied to the order in which the lines are processed. By keeping track of the lines that have been processed, then the data representing the lines will only be processed once. (Note that data representing all lines will be processed; however, the data may not be processed in the order in which it was recorded). Each data representing the flight path includes six outputs; the in-line and cross outputs from each of the three GGIs of the FTG 200. Thus, once a line is selected, the steps shown in blocks 610–620 are repeated six times; once for each of the GGI output channels.

A grid of the data is then made using data representing all lines except the data representing the selected line, as shown at block 610. Gridding software, such as neighborhood smoothing, can be used to generate the grid. The gridding method involves taking an average over the number of data points in a square area. For example, data is acquired on conceptual lines, and a map can be generated with these lines; however, in general the lines are not concisely spaced since the airplane may not be on an exact path. Estimates can then be made for locations of the exact values along the lines in regular spaced points. Thus, the gridding process involves estimating the value at each of these regularly spaced points for the data in order to place the data into the form of a grid or lattice. Unfiltered, this grid preserves most of the high-frequency energy in the line data. Thus, this grid of data represents a map that includes all data points except the data points selected at box 608. One exemplary gridding process that may be used is the "Average Value Method," described in *Contouring Geologic Surfaces With the Computer*, by Thomas A. Jones, David E. Hamilton and Carlton R. Johnson, and published by Van Nostrand Reinhold in October 1986, the entirety of which is herein incorporated by reference and to which the reader is referred for further information.

As shown at block 612, the grid is filtered using a lowpass filter. For example, the grid is filtered using a moving, square "box-car" method. The grid can then be used to estimate values at some distance away from observation locations. The lowpass filter can remove some noise within the data.

As shown at block 614, data representing a difference between the selected data and the grid is then fit to the grid. This can be accomplished by fitting the selected data to the grid, determining a difference between an output from the grid and the selected data, fitting a straight line through the difference, and subsequently subtracting the straight line from the resultant output. For example, a first order polynomial (e.g., a straight line) can be fitted to a difference between the selected line observations and an interpolation from the grid. By fitting the difference line to the grid, errors are separated from the data. For example, during a survey, the plane may turn around, for example, and resulting line data may erroneously be of a larger magnitude. In addition, as the plane begins a new line, GGI outputs may drift. Thus, by comparing the grid to the selected data (e.g., by performing a linear fit of the selected line and the difference line and subsequently removing the selected line fit), bias or drift errors in the selected data are removed.

Subsequently, the standard deviation of a difference between the line and the grid is determined, as shown at block 616. Standard techniques may be used to calculate the standard deviation between the line and the grid. For example, the grid is interpolated at each observation location on the selected line. Thus, an estimate of the selected line is made based on neighboring data points of the selected line. Using this estimate, a standard deviation of the difference between the estimate from the grid and the actual observation values of the selected line is determined.

At block 618, the processing unit 402 determines if the standard deviation is a lowest standard deviation. For example, the system determines if the previous step yielded the lowest standard deviation number for any of the filter cut-offs used at step 610. Thus, since the standard deviation is compared to a previous standard deviation calculation, the sequence of steps 612–620 is performed at least three times; e.g., the sequence is performed a first time to generate a reference standard deviation, a second time to generate a value to be compared to the reference value, and at least a third time to determine if the third standard deviation calculated decreased. Thus, the sequence of steps 612–620 is performed until a newly calculated standard deviation value increases; and in such a case, the previous standard deviation value then is deemed the lowest value. Therefore, the standard deviation is continually recalculated using data that is continually re-filtered to achieve (with a hope that the standard deviation continues to decrease) until the standard deviation increases. At that time, the previous standard deviation is deemed the lowest. Other optimization techniques could be used as well.

Alternatively, for an initial comparison, the processing unit 402 can compare the calculated standard deviation to a default value to determine if the standard deviation is low enough to be acceptable.

If the standard deviation is not the lowest (or not acceptable), the then filter cut-off frequency is changed, as shown at block 620. For example, there is an optimum filter length; if the filter length is too narrow, too much noise from the surrounding lines is passed, and if the filter length is too wide then signal information from the surrounding lines can be lost. The balance between these effects leads to a filter length that yields the minimum standard deviation.

If the cut-off filter wavelength is to be changed, the cut-off value can be increased by increments of two. For instance, the filter may be initialized to a filter length of three grid spaces when using a boxcar filter, and when changing the cut-off value, the filter length can be increased to five grid spaces, seven grid spaces, etc., until the standard deviation is acceptable. This can be accomplished using other techniques as well.

Step 620 is an iterative process. The cut-off length is continually increased until a standard deviation between the filtered data and the selected line data is acceptable. As mentioned, within the method of FIG. 6, steps 612–620 are repeated for each set of data representing a different flight path. For example, the steps 612–620 are repeated or are executed for each of the six GGI outputs (i.e., the FTG 200 includes three GGIs 202*a*–*c* and each produces two outputs that are different components of a gravity gradient signal) of each set of data representing a line.

By performing steps 612–620, differences between the selected line data and data representing neighboring lines can be identified. Differences between neighboring line data and the selected line data is dependent upon the filtering of the data. The neighboring data represents data of a different terrain from the selected line data, thus a short filter length is desired. However, neighboring lines are also noisy, thus it is desirable to filter the gridded data to remove noise. But, if the filter length is too long, then data representing characteristics of neighboring lines can be lost, and if the filter length is too short (e.g., averaging over a shorter time) then too much noise may be passed from the neighboring lines to the grid. Also, different lines can have different filter lengths, since the lines represent data from different geographical areas. Thus, this optimization process occurs for each selected line, and six times per selected line.

Once the standard deviation is acceptable, e.g., the current calculated standard deviation is lower than the previous calculated standard deviation, then the data (e.g., the grid of data with the fitted difference line) is passed through a filter that has the optimum filter length as determined through step 620, as shown at block 622. Next, the standard deviation between the selected line data and the filtered grid data is calculated and compared to a threshold value, as shown at block 624. For example, if the standard deviation is below a threshold value, then the selected line is deemed to be of good quality. However, if the standard deviation is too high, or is above a threshold level, then the selected data may contain too much noise or other errors and is thrown out because the selected line varies too much from its neighbors and the flight path of the selected data may need to be repeated. As an example, for each line six standard deviations are calculated due to the six GGI outputs, and if the standard deviation is more than 20 Eötvös (E) on two or more GGI outputs, then the selected line may be thrown out. However, this is only one example, since the threshold value depends largely on the characteristics of the geological target or survey area, types of filtering used on the data, and/or customer preferences, for example.

If the standard deviation is the lowest, then new data is selected to be processed, as shown at block 626. However, if all lines have been processed, then vertical acceleration and line name information is imported to the processing unit 402 (e.g., vertical acceleration information is written to a file during the high-rate compensation portion of the FTG data processing). Line names are derived from survey planning software and time tagged so that lines can be linked to their code names, as shown at block 628. For example, GGI performance is tracked by comparing line mis-match numbers with the acceleration environment that the vehicle was experiencing. The standard deviation of the vertical acceleration, measured over 60 second intervals, is recorded in a binary format file during the high-rate compensation portion of the FTG data processing. The standard deviation is read and matched, using time tags, to the line data. Line name information derived from the survey plan is imported from an ASCII format file. The line names are matched to the lines using time tags.

Next, plots are created, as shown at block 630. For example, a multi-page set of plots is written to a postscript format file. For each line, a chart is drawn showing each of the six GGI outputs. Also, a set of scatter plots can be created that illustrate how the mis-match standard deviation for each of the GGI outputs depends on a z-acceleration level, for example.

Figure 7:
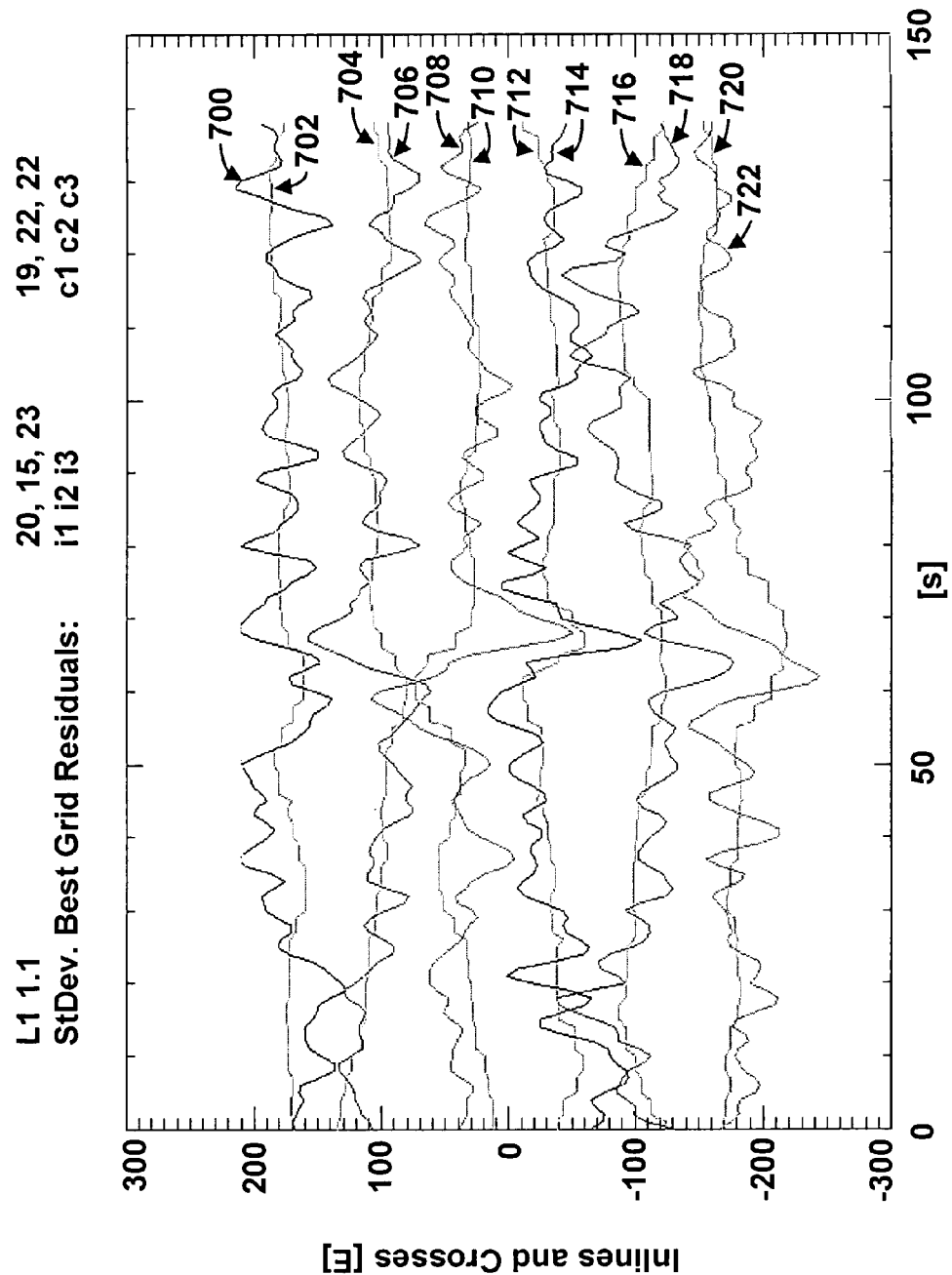
FIG. 7 illustrates one example of a set of plots that can be generated from survey flight data.

FIG. 7 illustrates one example of a set of plots that can be generated for the survey flight data. The plot illustrates six lines 700, 706, 708, 714, 718, and 722 that are the six GGI outputs (e.g., in-line and cross outputs for each of the three GGIs). The interpolation from the grid is superimposed on the plot for each of these lines and is illustrated underneath each line in the plot. For example, the interpolation of line 700 is shown as line 702. Similarly, the interpolation of line 706 is shown as line 704, the interpolation of line 708 is shown as line 710, the interpolation of line 712 is shown as line 714, the interpolation of line 716 is shown as line 718, and the interpolation of line 720 is shown as line 720. The six standard deviation values calculated between the interpolations and the lines are listed at the top of the plot. As shown, the standard deviation of in-line 1 is 20, and so forth. Alternate plots, and/or other information can also be illustrated.

Subsequently, a summary spreadsheet can be created, as shown at block 632. For example, a spreadsheet is created with ASCII comma separated values (CSV) summarizing the line-by-line performance. This format may be readily viewed using Microsoft Excel@, for example. In particular, the spreadsheet may include columns that are page number (in the plot set), line name (e.g., name of the flight path), start time and date, z-acceleration, in-line 1, in-line 2, in-line 3, cross 1, cross 2, cross 3, the worst of the 6 values, the second worst of the six values and the third worst of the 6 values. (Note that each GGI of the FTG outputs one in-line and one cross signal, thus there are three in-line and three cross signals due to the three GGIs in the FTG). The last three columns are useful when selecting which lines need to be repeated. An example spreadsheet is shown below in Table 1.

TABLE 1

| Page | Line | Starts | Z-accel | i1 | i2 | i3 | c1 | c2 | c3 | Worst | 2nd Worst | 3rd Worst |
|------|------|--------|---------|----|----|----|----|----|----|-------|-----------|-----------|
| 0 | L11.1 | Mar. 4, 2004 12:10:13 | 33 | 20 | 15 | 23 | 19 | 22 | 22 | 23 | 22 | 22 |
| 1 | L31 | Mar. 4, 2004 12:19:39 | 32 | 20 | 18 | 16 | 18 | 16 | 19 | 20 | 19 | 18 |
| 2 | L51 | Mar. 4, 2004 12:26:18 | 31 | 15 | 11 | 11 | 21 | 25 | 17 | 25 | 21 | 17 |
| 3 | L71 | Mar. 4, 2004 12:32:11 | 33 | 18 | 13 | 16 | 20 | 23 | 20 | 23 | 20 | 20 |
| 4 | L91 | Mar. 4, 2004 12:39:11 | 30 | 20 | 14 | 20 | 18 | 29 | 20 | 29 | 20 | 20 |
| 5 | L111 | Mar. 4, 2004 12:45:00 | 32 | 14 | 13 | 14 | 20 | 16 | 22 | 22 | 20 | 16 |
| 6 | L131 | Mar. 4, 2004 12:51:15 | 24 | 13 | 14 | 14 | 16 | 19 | 14 | 19 | 16 | 14 |

TABLE 1-continued

| Page | Line | Starts | Z-accel | i1 | i2 | i3 | c1 | c2 | c3 | Worst | 2nd Worst | 3rd Worst |
|---|---|---|---|---|---|---|---|---|---|---|---|---|
| 7 | L151 | Mar. 4, 2004 12:57:04 | 26 | 13 | 17 | 12 | 14 | 20 | 14 | 20 | 17 | 14 |
| 8 | L171 | Mar. 4, 2004 13:02:43 | 22 | 14 | 20 | 14 | 19 | 25 | 15 | 25 | 20 | 19 |
| 9 | L191 | Mar. 4, 2004 13:08:25 | 26 | 9 | 14 | 12 | 16 | 22 | 17 | 22 | 17 | 16 |
| 10 | L211 | Mar. 4, 2004 13:13:52 | 23 | 18 | 13 | 15 | 12 | 35 | 21 | 35 | 21 | 18 |

The example data in Page 0 of Table 1 is the data that was used to create the example plot shown in FIG. 7. The z-acceleration shown in Table 1 is an indication of how rough the flight was or how turbulent the survey flight may have been. The number in the Table is a standard deviation of the z-acceleration averaged over a period of time. For example, a desirable value for the z-acceleration may be in the range of 10–30 mGal. One of ordinary skill will recognize that alternate formats other than that shown in Table 1 can be implemented as well.

The spreadsheet in Table 1 can be used to evaluate the data. For instance, if any of the standard deviations of any of the in-line or cross signals, and/or z-acceleration signals for a particular survey line are too high, then that survey flight path may be repeated to recollect data.

The method illustrated in FIG. 6 is an auto evaluation method performed by a processing unit 400 within or coupled to the FTG 200. The method is performed as a quality check on recorded data. The auto evaluate method allows field personnel to judge data close to real time to determine whether to repeat a flight path while still out in the field, rather than finishing a survey flight and processing the data at a headquarters, and possibly then determining that some data is bad which would require portions of the survey flight to be repeated. Results from the auto evaluation method are quantitative, and give field personal some guidance to determine whether to repeat a portion of a survey flight, for example.

Figure 8:
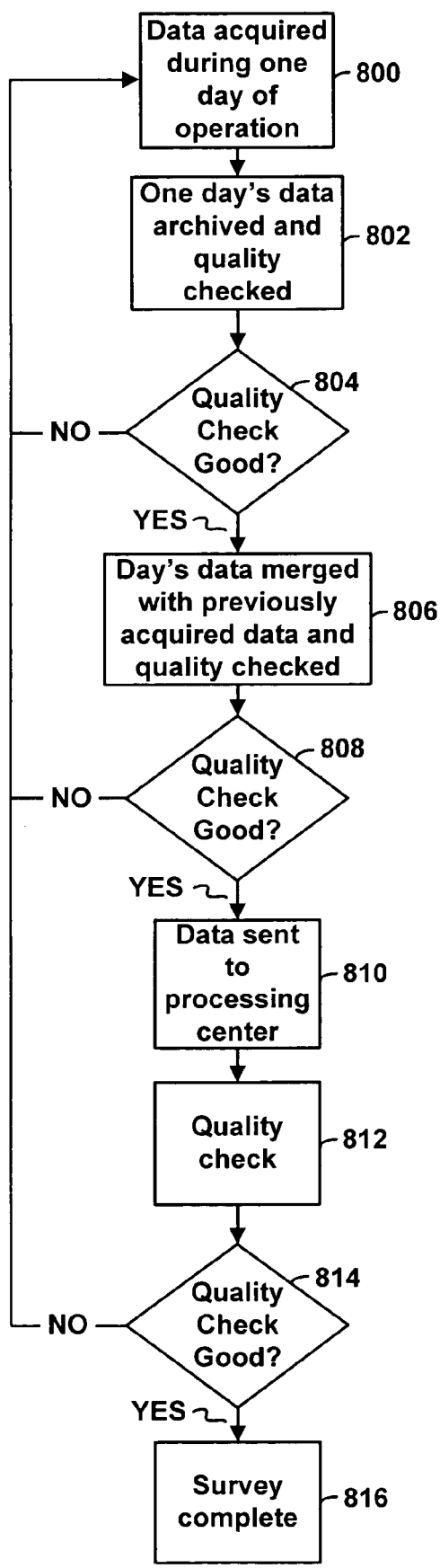
FIG. 8 is a flowchart depicting one embodiment of a method for performing the auto evaluation of geophysical survey data.

FIG. 8 is a flowchart depicting one embodiment of a method for performing the auto evaluation of geophysical survey data. As shown at block 800, initially data is acquired from a geological survey. Next, in this example, two hours of data is archived and quality checked, as shown at block 802. For example, the data may be processed using the auto evaluation method illustrated in FIG. 6. If the data does not meet a desired threshold for acceptable quality, then new data is acquired. If the data meets the desired threshold for acceptable quality, as shown at block 804, then twenty-four hours of data is merged together and quality checked, as shown at block 806. For example, data can now be compared to a larger pool of data, using the auto evaluation method, to obtain a more broad comparison of the data.

Subsequently, if the merged data does not meet the desired threshold for acceptable quality, then again, new data is acquired. However, if the data meets the threshold, then the data can now be sent to a processing center such as the Bell Geospace Technical Department, as shown at block 810, and quality checked at this department, as shown at block 812. For example, now the data can be processed further using the standard techniques and potential denoising stages of FIG. 5. For instance, the standard techniques stage involves a skilled operator looking through the data using geophysical visualization and editing software to further process the data to identify errors. Procedures similar to auto-evaluate may implicitly be performed at the control department, but this may involve looking at differences between lines and making a judgment about whether the data is valid, for example.

If the data does not meet a desired threshold, then new data is acquired (possibly by repeating the survey flight), as shown at block 814. However, if the data meets the desired quality limits, then the survey is complete, as shown at block 816.

It is intended that the foregoing detailed description be regarded as illustrative rather than limiting, and it is intended to be understood that the following claims including all equivalents define the scope of the invention.

What is claimed is:

1. A method for evaluating geophysical measurements comprising:
   receiving first geophysical data recorded from a first flight path of a geophysical survey flight;
   receiving second geophysical data recorded from neighboring flight paths of the first flight path, the neighboring flight paths being within the geophysical survey flight; and
   comparing the first geophysical data and the second geophysical data to estimate a quality of the first geophysical data,
   wherein the first geophysical data and the second geophysical data includes full-tensor gravity gradient data.

2. The method of claim 1, wherein the second geophysical data recorded from the neighboring flight paths are data recorded from flight paths in a close proximity to the first flight path.

3. The method of claim 1, wherein comparing the first geophysical data and the second geophysical data to estimate the quality of the first geophysical data comprises:
   forming a grid of data from the second geophysical data; and
   determining a standard deviation of a difference between the grid of data and the first geophysical data.

4. The method of claim 3, wherein if the standard deviation is below a threshold value, then the first geophysical data is deemed to be of good quality.

5. A method for evaluating geophysical measurements comprising:
   receiving geophysical data recorded from a geophysical survey flight, wherein the geophysical data is recorded from a series of flight paths covering a survey areas and wherein the geophysical data includes full-tensor gravity gradient data;
   selecting a first set of data from the geophysical data, wherein the first set of data is recorded from a first flight path;

generating a grid using neighboring geophysical data from the geophysical data, wherein the neighboring geophysical data is recorded from flight paths that neighbor the first flight path; and comparing the first set of data and the grid to estimate a quality of the first set of data.

6. The method of claim 5, wherein a flight path is a flight trajectory that is generally a straight line, and wherein the series of flight paths are generally a series of nominally parallel survey lines that cover the survey area.

7. The method of claim 5, wherein comparing the first set of data and the grid to estimate the quality of the first set of data comprises determining whether the first set of data accurately represents geophysical characteristics of the first flight path.

8. The method of claim 5, further comprising:
performing a high-rate compensation on the geophysical data by subtracting self-gradient acceleration effects; and performing a correction for mis-ties within the geophysical data.

9. The method of claim 5, wherein comparing the first set of data and the grid to estimate the quality of the first set of data comprises comparing the first set of data and data recorded from neighboring flight paths.

10. The method of claim 5, wherein flight paths that neighbor the first flight path are flight paths that cover geographic areas in close proximity to the first flight path.

11. The method of claim 5, further comprising removing a terrain signal from the geophysical data.

12. The method of claim 5, further comprising transforming the geophysical data into a reference coordinate frame.

13. The method of claim 5, wherein selecting the first set of data from the geophysical data comprises selecting the first set of data at random from the geophysical data.

14. The method of claim 5, wherein generating the grid using neighboring geophysical data from the geophysical data comprises generating a grid using data representing all flight paths from the series of flight paths except data representing the first flight path.

15. The method of claim 5, further comprising filtering the grid using a box-car filter.

16. The method of claim 15, wherein comparing the first set of data and the grid to estimate the quality of the first set of data comprises determining a standard deviation of a difference between the first set of data and the grid.

17. The method of claim 16, further comprising determining if the standard deviation is acceptable.

18. The method of claim 17, wherein if the standard deviation is not acceptable, further comprising changing a cut-off frequency of the boxcar filter and filtering the grid using the changed cut-off frequency.

19. The method of claim 17, wherein determining if the standard deviation is acceptable comprises determining an optimum filter length of the boxcar filter.

20. The method of claim 19, further comprising filtering the grid using the optimum filter length to produce a filtered grid.

21. The method of claim 20, further comprising:
determining a second standard deviation between the first set of data and the filtered grid; and comparing the second standard deviation to compared to a threshold value.

22. A system comprising:
a full tensor gradient instrument for recording geophysical data of a geographical area; and a processing unit for (i) receiving first geophysical data recorded from a first flight path of a geophysical survey flight of the geographical area, (ii) receiving second geophysical data recorded from a neighboring flight path of the first flight path, (iii) and comparing the first geophysical data and the second geophysical data to estimate a quality of the first geophysical data.

23. The system of claim 22, wherein the full tensor gradient instrument comprises:
an inertial platform that provides measurements of a vertical velocity and an acceleration of a survey vessel; and a geophysical instrument.

24. The system of claim 22, wherein the geophysical instrument is a gravity gradiometer.

25. The system of claim 22, wherein the full tensor gradient instrument comprises:
a plurality of gyroscopes;

a plurality of accelerometers; and a navigation system;

wherein the gyroscopes and the accelerometers, in combination with the navigation system provide position data, and enable the full tensor gradient instrument to map a flight path of an airborne survey vessel.

26. A method for evaluating geophysical measurements comprising:
recording geophysical data during a geophysical survey flight, wherein the geophysical survey flight comprises a series of flight paths covering a survey area, and wherein the geophysical data includes full-tensor gravity gradient data; and during the geophysical survey flight, evaluating the geophysical data to estimate a quality of the geophysical data by:
selecting a first set of data from the geophysical data, wherein the first set of data is recorded from a first flight path, the first flight path being one of the series of flight paths;

generating a grid using neighboring geophysical data from the geophysical data, wherein the neighboring geophysical data is recorded from flight paths that neighbor the first flight path; and determining a standard deviation between the first set of data and the grid to estimate a quality of the first set of data.

* * * * *